United States Patent [19]

English et al.

[11] Patent Number: 4,636,284
[45] Date of Patent: Jan. 13, 1987

[54] PROCESS FOR THE SEPARATION OF WATER FROM A WATER-CONTAINING MIXTURE OR AZEOTROPE WITH AN EXTRACTANT, AND FOR THE SEPARATION OF WATER FROM SAID EXTRACTANT

[76] Inventors: John C. English, 300 Morris, Longview, Tex. 75602; John A. Ondrey, 4600 Paluxy, Tyler, Tex. 75703; Jason M. Voyce, Rte. 21, Box 296, Tyler, Tex. 75709

[21] Appl. No.: 611,906

[22] Filed: May 18, 1984

[51] Int. Cl.$^4$ .............................................. B01D 3/40
[52] U.S. Cl. ....................................... 203/18; 203/19; 203/23; 203/24; 203/26; 203/42; 203/64; 203/78; 203/84; 568/916; 55/32
[58] Field of Search ...................... 203/12, 14, 18, 19, 203/21, 22, 23, 24, 27, 42, 64, 78, 84, 94, 98, 25, 26; 568/868, 916; 159/47.1; 55/32

[56] References Cited

U.S. PATENT DOCUMENTS

| 2,901,404 | 8/1959 | Kirshenbaum et al. | 203/19 |
| 3,370,636 | 2/1968 | Francis et al. | 203/18 |
| 3,451,897 | 6/1969 | Welch | 55/32 |
| 3,867,112 | 2/1975 | Honerkamp et al. | 55/32 |
| 4,230,887 | 10/1980 | Mitchell et al. | 203/64 |
| 4,273,620 | 6/1981 | Knobel | 203/18 |
| 4,400,241 | 8/1983 | Braithwaite et al. | 203/18 |

FOREIGN PATENT DOCUMENTS 0643487  1/1979  U.S.S.R. ............................. 568/868

Primary Examiner—S. Leon Bashore
Assistant Examiner—Andrew J. Anderson

[57] ABSTRACT

A process for the separation of water from a water-containing mixture of azeotrope, with an extractant which removes water from the mixture or azeotrope, recovery of the non aqueous portion of the mixture or azeotrope as a product, and regeneration of the extractant for reuse by the removal of water therefrom. A feature thereof is that residual water can be removed from the extractant, and the extractant regenerated for reuse by contacting the heated extractant with a portion of the same product from which the water has been removed; or, the extractant can be regenerated in the process by contact with an inert gas which has been dried in the process. The water-containing mixture or azeotrope is preferably contacted with a portion of the vaporous product to recover the heat of condensation for use in the process.

11 Claims, 1 Drawing Figure

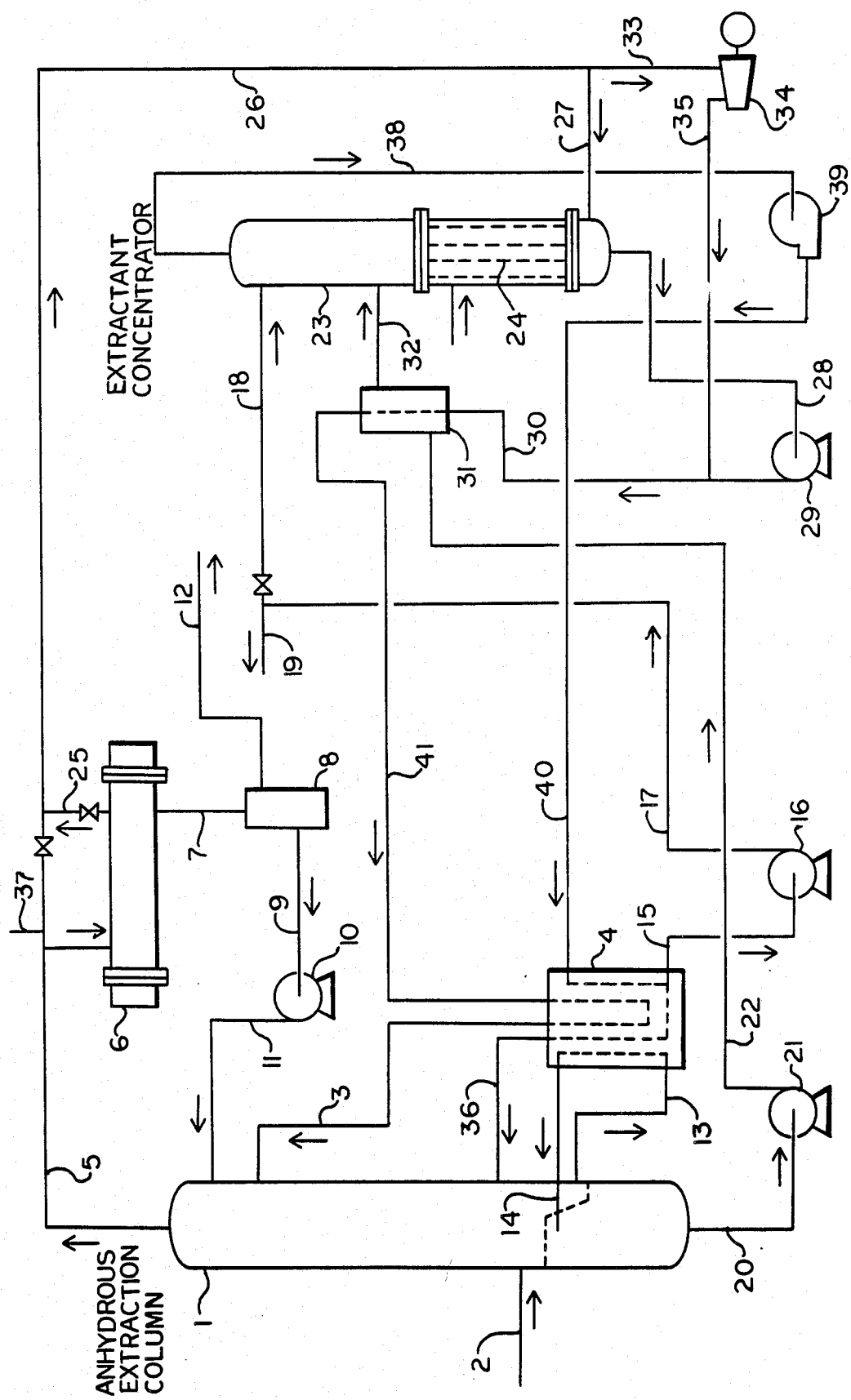

PROCESS FOR THE SEPARATION OF WATER FROM A WATER-CONTAINING MIXTURE OR AZEOTROPE WITH AN EXTRACTANT, AND FOR THE SEPARATION OF WATER FROM SAID EXTRACTANT

BACKGROUND OF THE INVENTION

I. Field of the Invention

This invention relates to the separation and removal of water from a water-containing mixture or azeotrope with an extractant, as well as for the separation and removal of water from said extractant. In particular, it relates to the separation and removal of water from an alcohol-water mixture with an extractant, and for the regeneration of said extractant by the removal of water therefrom.

II. Background and Problems

Distillation operations in the petroleum and chemical industries have as their objective the separation of individual components from volatile liquid mixtures consisting, for the most part, of several well defined components. The principles of distillation and rectification are well known. Distillation, the broader term applied to vaporization processes, is that type of process wherein the vapor evolved from a still is recovered by condensation. Rectification is a distillation carried out in such manner that the vapor evolved from the still is contacted with a condensed portion of vapor previously evolved from the same still (reflux). The resulting transfer of material and interchange of heat between the vapor and liquid produces greater enrichment of the vapor with the more volatile components than is possible by simple distillation utilizing the same amount of heat.

Subsequent to the separation by rectification of a more volatile component from a liquid admixture, the separated product component often is not in as pure a form as is desired. For example, after distillation or rectification of an alcohol from an aqueous admixture, the recovered alcohol generally contains more water than is desirable for many purposes. Alcohols such as ethanol, n-propanol, or isopropanol, thus form azeotropic or constant boiling mixtures with water for which reason there is a limitation on the amount of water which can be removed from the alcohol by ordinary distillation, or rectification. Thus, once an azeotrope of the alcohol and water is formed the boiling point of the remaining alcohol-water system does not change as vapor is generated and removed. Consequently, to obtain anhydrous alcohol it is necessary to use means other than ordinary distillation, or rectification to remove the last bit of water from the azeotrope, or alcohol-water system.

Present methods for the separation of water from a compound, e.g. alcohol, requires distillation, or rectification, of the aqueous alcohol admixture in a multistage still to separate and recover an alcohol-water azeotropic composition from the still. To the azeotropic composition is then added an agent such as an entrainer, adsorbent, or extractant to assist in removing the residual water from the alcohol-water azeotropic composition. Various schemes are known for removing the final amount of water from the alcohol-water azeotropic composition, to wit:

Using an entrainer: The water, alcohol, and entrainer, e.g. benzene, are distilled in a multistage distillation column. The alcohol passes downwardly through the column and is removed from the bottom of the column. The water and entrainer ascends within the column, and is removed from the top of the column as a vapor mixture, and then condensed. The water and entrainer are then separated in a decanter and the water is removed from the system. The entrainer is recycled to the column and reused.

Using an adsorbent: The water and alcohol are passed through a bed of the adsorbent where water is adsorbed on the surface or in the pores of the adsorbent. The water is usually removed from the adsorbent by contact with a hot gas. The adsorbent may be reused, or if fermentable it may be fermented to make additional alcohol.

Using an extractant: The water, alcohol and extractant are distilled in a multistage distillation column. The alcohol passes upwardly through the column and is removed from the top of the column. The water and extractant pass downwardly through the column and is removed from the bottom of the column. The water may be removed from the extractant by boiling the water out of the extractant-water mixture, and the extractant then reused.

The use of an extractive agent provides a relatively simple and economical process for removing water from these and other azeotropic mixtures. The removal of the last portion of water from the extractive agent itself however is also a most desirable objective. This however requires high temperature, or high vacuum, or both. It is thus necessary to remove the water from the extractant down to a very low concentration for the efficiency of the extractant in removing water from the alcohols requires the extractant to be dry, or water if present must be in very low concentration. High temperatures cause the extractant to deteriorate. High vacuum, on the other hand, requires expensive equipment and the expenditure of considerable energy.

OBJECTS OF THE INVENTION

It is, accordingly, the primary objective of the present invention to provide a process which will fill these needs.

It is a specific object of this invention to provide an extractive distillation process for removing water from an azeotrope, and water from the extractive agent used in the extractive distillation process employed to dry said azeotrope; especially one which does not require high temperature or high vacuum.

It is another object of this invention to provide a simple and economical process of such character for removing water from alcohols and other compounds that form azeotropes with water.

A further objective is to provide a process wherein fewer and smaller pieces of equipment are required than in known processes; which process is continuous and easier to control with more tolerance on allowable process variables than other processes.

THE INVENTION

These objects and others are accomplished in accordance with the present invention embodying a novel process for removing water from a water-containing azeotropic composition, or azeotrope, by extractive distillation, recovery of the non-aqueous portion of the azeotrope as a product, while drying and regenerating the extractant to render it suitable for reuse as an extractant in the process. Features of this process include, in the extractive distillation process, (1) the use of a gas stripping agent, particularly a portion of the dried product itself, to remove water from the extractant, (2) the addition of reflux to the extractant as a compressed vapor to use the heat of condensation of this reflux to provide driving heat to the anhydrous column, and (3) the reuse of heat in regeneration of the extractant. The process of this invention is particularly applicable to the removal of water from water-alcohol azeotropes, with the feature that the extracting agent, or extractant, used to effect removal of water from the water-alcohol system can itself be effectively and efficiently dried and regenerated for reuse in the process. The process has particular applicability to the separation of water from azeotropes of water and the low molecular weight aliphatic monohydric alcohols, especially aliphatic monohydric alcohols of carbon number ranging from 1 to about 6, particularly ethanol, n-propanol and isopropanol.

In general, the process embodies the extractive distillation of an aqueous, or water-containing azeotrope in an extractive distillation column, an ascending stream of the vaporized azeotrope, e.g. alcohol and water, as feed being countercurrently contacted with the extractant, e.g. glycerol, glycols, or any high boiling water soluble material which is added to the alcohol-water system to reduce the activity and vapor pressure of the water to act as a water-separating agent, or agent for the extraction of water from the alcohol. A major portion of the water is then boiled out of the extractant in a heat exchanger, and a last portion of water is removed from the extractant by an externally heated extractant concentrator which contains a small portion of the non-aqueous portion of the azeotrope, or compound, from which the water is being removed. Within the extractant concentrator this compound is passed through the concentrator tubes in contact with the extractant. The hot extractant from the concentrator, from which the last portion of water is essentially removed, is passed through the heat exchanger to boil the water out of the wet extractant. Additional heat can be imparted to the extractant passing through the heat exchanger by compressing some of the vapor of the compound from which water has been extracted and injecting this vapor into the zone which contains the extractant. The heat exchanger removes excess heat from the extractant before it is passed into the extraction column to flow therethrough to extract water from the non-aqueous portion of the azeotrope, or alcohol.

A principle advantage of the present process resides in the discovery that a very high boiling extractant such as glycerol, tetraethylene glycol or low boiling compound such as ethylene glycol, can be used in this process to extract the water from aqueous azeotropic mixtures.

A wide variety of extractants can be utilized in the practice of this invention.

Extractants which have a great affinity for water and from which the water is very difficult to remove, such as glycerol, are a more efficient class of extractants and more economical in the use of energy than extractants that have less affinity for water. These efficient extractants require smaller equipment and less energy to heat and pump than less efficient extractants. Exemplary of such extractants are glycol diethers, e.g. the dialkyl ethers of diethylene glycol such as the dimethyl ether of diethylene glycol, the diethyl ether of diethylene glycol, the dipropyl ether of diethylene glycol, and the like; and the dialkyl ethers of tetraethylene glycol, e.g. such as the dimethyl ether of tetraethylene glycol, the diethyl ether of tetraethylene glycol, the dipropyl ether of tetraethylene glycol and the like. Some of the other more efficient extractants are organic compounds which are very soluble in water, but less soluble in alcohol, or compound from which water is to be removed. Exemplary of such compounds are salts which are very soluble in water such as sodium or potassium formate, sodium or potassium acetate, or magnesium chloride, or mixtures of these salts dissolved in a high boiling liquid such as tetraethylene glycol. Other salts include sodium tetraborate, sodium metaborate, potassium tetraborate and potassium metaborate. In general the preferred concentration of extractant is from about 50 percent to about 300 percent by volume of extractant: feed (measured as liquid); with about a 1:1 ratio being generally preferred.

These features and others will be better understood by reference to the following detailed description of a preferred embodiment of the invention, and to the attached drawing to which reference is made as the description unfolds. In the drawing, preferred apparatus useful for practicing the process of this invention is illustrated schematically, and numbers are used to designate different apparatus components, and features.

IN THE DRAWING

The FIGURE depicts two principal vessels: an anhydrous column and extractant concentrator, with which is associated various auxillary components such as heat exchangers, condenser, vaporizer, compressor, pumps and lines for transfer of materials and heat between these vessels.

Referring generally to the FIGURE there is shown an anhydrous column or extraction column 1 and an extractor concentrator 23. A water-containing vapor feed, e.g. 190 proof ethanol, is injected into the anhydrous column 1 via line 2. The vapor feed, an azeotrope of water and ethanol, rises within the anhydrous column 1, while an extractant, e.g. tetraethylene glycol, is fed into the top of the anhydrous column 1 via line 3, the extractant flowing downwardly within the extraction column 1 to contact and extract water from the rising vapor feed. The wet extractant leaves the bottom of the column 1 via line 13 where it is passed through the heat exchanger 4 in heat exchange relationship with an extractant stream from the extractant concentrator 23 introduced via line 41 into heat exchanger 4, and thence into the anhydrous column 1 via line 3.

The vapor from which most of the water has been removed flows from the top of anhydrous column 1 via line 5 to condenser 6 where the major portion of the vapor is condensed to liquid, transferred via line 7 to and collected in tank 8. Liquid from tank 8 is withdrawn from tank 8 via line 9 and pumped via the use of pump 10 through line 11 as reflux to the anhydrous column 1, the remaining liquid flowing out of tank 8 via line 12 as an alcohol product, e.g. ethanol. Reflux is necessary to provide rectification in this column to obtain the desired purity of the product. With the product vapor going to the condenser there is also a smaller loss of extractant vapor out the top of the extraction column.

The wet extractant in heat exchanger 4 is also heated by the vapors passed therethrough which are received from the extractant concentrator 23. The vapors give up their heat, and a major portion of the vapors, particularly the water vapor, is condensed. The portion of the vapors that is not condensed, which consists principally of alcohol, is passed from heat exchanger 4 through line 36 into column 1. A large portion of the alcohol and water in the wet extractant is boiled out of the extractant in heat exchanger 4, and the extractant returned to column 1 via line 14. Wet extractant, or extractant, which contains a small amount of alcohol and some water, exits the column through line 20 and pump 21 which pumps the wet extractant through line 22 to heat exchanger 31 where it is heated in heat exchange relationship with hot dry extractant from the extractant concentrator 23. Additional alcohol and water are boiled out of the wet extractant stream as it is passed through heat exchanger 31. The wet extractant is thus passed via line 32 into the extractant concentrator 23 where it descends to meet hot vapor rising from tubes 24 of the extractant concentrator 23. Additional water in the wet extractant together with some of the solvent in the extractant is vaporized and flows up the concentrator 23 which contains distillation trays (not shown) in the upper compartment.

The vapors which are condensed in heat exchanger 4 form a condensate which is withdrawn via line 15 from the heat exchanger 4 and pumped via pump 16 through line 17 and 18 to the top of the extractant concentrator 23 as reflux, the liquid passing downwardly from tray to tray in the concentrator to remove the extractant vapor from the stream of vapor rising in the concentrator. Essentially only the alcohol and water vapors leave the top of the concentrator through line 38. These vapors are compressed by blower 39 and passed via line 40 to heat exchanger 4, and the uncondensed vapor portion thence to anhydrous column 1 via line 36.

The remaining portion of condensate from heat exchanger 4, not used for reflux, is pumped via line 19 to a beer still (not shown) which is supplying the feed to the system. The water is thus removed from the drying system.

The liquid introduced via lines 18, 32 into the extractant concentrator 23 flows down tubes 24 which are heated by steam from an external source. A portion of the vapor from the top of anhydrous column 1, is introduced via lines 5, 26, 27 into the bottom compartment of extractant concentrator 4 to ascend through tubes 24 down through which the wet extractant is flowing. These vapors lower the partial pressure of the water vapor in contact with the wet extractant and yet more water is vaporized from the extractant to maintain an equilibrium between the water vapor in the upflowing stream of vapor.

Since the vapors introduced into the concentrator 23 via line 27 contains very little water, the water in the extractant can be reduced to a very small percentage without use of an excessively high temperature. Hot dry extractant is removed via line 28 from the bottom of extractant concentrator 23 and pumped via pump 29 to line 30.

In an alternative, but less preferred embodiment, a non-reactive or inert gas can be used to further reduce the water content, or dry the extractant. Thus, instead of the alcohol vapor removed from the top of anhydrous column 1 a small amount of inert gas such as carbon dioxide or nitrogen can be introduced into the system via line 37 and conducted to the bottom of concentrator 23 through lines 25, 26, 27 and passed upwardly through tubes 24 to contact the extractant and remove the last portion of water from said extractant. When inert gas is used as the stripping means, excess water is supplied to the condenser 6 to condense most of the alcohol or other vapor out of the inert gas being used for stripping. This gas, or alcohol which is used for stripping, flows upwardly through tubes 24 into the top compartment of the concentrator 23 where it is contacted by the incoming extractant fed into the extractant concentrator 23 via line 32, and by reflux which is poured onto the trays in the top compartment via reflux line 18. This inert gas or alcohol is returned to column 1 via line 38, blower 39, and lines 40, 36. The inert gas, or alcohol flows upwardly through extraction column 1, and the water is removed. The inert gas is as dry as the alcohol which leaves condenser 6 and consequently will remove the water from the extractant down to a very low percentage. The inert gas is used repetitively in such capacity, it being necessary to add only a small amount of inert gas as makeup through line 37.

In another alternative embodiment, a portion of uncondensed alcohol vapor in line 26 may be withdrawn via the action of compressor 34 and this vapor compressed and introduced via line 35 into line 30 which contains hot dry extractant from the bottom of extractant concentrator 23. This alcohol vapor under a pressure as great as the pressure of the extractant in this line will be absorbed into the extractant and its temperature raised due to the heat of condensation of the alcohol. This feature will provide additional heat to vaporize additional water from the wet extractant in heat exchanger 31 and heat exchanger 4. The alcohol-containing dry extractant is cooled by the evaporation of water from the wet extractant, and then transferred from heat exchanger 31 via line 41 to heat exchanger 4 and via line 3 to column 1.

The invention, its principle and mode of operation, is exemplified and will be better understood by reference to the following example. The following table thus indicates quantitatively the magnitude, composition and conditions in a preferred embodiment of this invention as herein described by reference to the attached FIGURE to produce from 0.924 weight fraction ethanol one million gallons per year of ethanol with one-half weight percent water in the ethanol product.

TABLE

| Line Number | Flow pounds per hour | | | Temperature °C. | Pressure, psi gauge |
|---|---|---|---|---|---|
| | Ethanol | Water | Extractant | | |
| 2 | 835 | 69 | 0 | 89 | 6 |
| 3 | 559 | 1 | 806 | 91 | 3 |
| 5 | 1763 | 8.5 | 0 | 83 | 3 |
| 7 | 1120 | 5.6 | 0 | 83 | 3 |
| 9 | 285 | 1.2 | 0 | 83 | 8 |
| 12 | 835 | 4.1 | 0 | 83 | 0 |
| 18 | 9.5 | 32.1 | 0 | 87 | 0 |
| 19 | 4.5 | 65 | 0 | 87 | 8 |
| 22 | 18 | 72 | 806 | 99 | 8 |
| 27 | 80 | 0.4 | 0 | 83 | 3 |
| 28 | 0 | 1 | 806 | 150 | 6 |
| 35 | 550 | 1.4 | 0 | 150 | 35 |
| 36 | 93 | 7.4 | 0 | 86 | 5 |
| 40 | 107 | 104.5 | 0 | 146 | 35 |

It is evident that the process of the present invention avoids the use of extreme temperatures and the use of high vacuum to remove the water from the extractant and provides a continuous process for removing water from a mixture of an organic liquid and water, that is efficient and easy to control.

Exemplary of other water-containing mixtures or azeotropes which can be similarly processed are for example n-propanol-water, isopropanol-water, tetrahydrofuran-water, methyl ethyl ketone-water, n-butanol-water, isobutyl alcohol-water, or mixtures of water and methyl n-propyl ketone, methyl isobutyl ketone, ethyl acetate, isopropyl acetate, n-propyl acetate, methyl propionate, ethy propionate and the like.

The water-containing mixture may or may not be an azeotrope, and it may contain more or less water than the corresponding water-containing azeotrope. The process of this invention is applicable to mixtures from which water is difficult to remove by rectification, e.g. a mixture of water and acetic acid.

It is apparent that some variations and changes can be made without departing the spirit and scope of the present invention.

Having described the invention, what is claimed is:

1. In a process for the extraction, in an anhydrous extraction column, of water from a water-containing product by countercurrent contact of a vaporous stream of the water-containing product with a liquid extractant to remove water from said water-containing product, the extractant retaining water removed from the water-containing product while recovering a vaporous stream of said product from which water has been removed, and water is removed from the water-containing extractant in an extractant concentrator associated with said anhydrous extraction column, the improvement comprising, boiling the water-containing extractant in a first heat exchanger associated with said extraction column, which is heated with water vapor from the water removed from the extractant to provide reboil for the extraction column, transporting the extractant from the anhydrous extraction column to a second heat exchanger associated with an extractant concentrator, heating and removing a major portion of the water from said extractant within said second heat exchanger which is heated by hot dried extractant produced in said extractant concentrator, this leaving residual water in said extractant, and then removing the residual water from the extractant while countercurrently contacting said heated extractant within said extractant concentrator with at least a portion of said vaporous stream of said product from which water has been removed, and then transporting said product used to remove residual water from said extractant to said first heat exchanger and therein condensing a portion of this vapor product stream to supply heat to the extraction column.

2. The process of claim 1 wherein the water-containing product is comprised of an admixture of water and alcohol.

3. The process of claim 2 wherein the alcohol is a low molecular weight monohydric alcohol containing from one to about 6 carbon atoms.

4. The process of claim 3 wherein the alcohol is ethanol, n-propanol or isopropanol.

5. In a process for the extraction, in an anhydrous extraction column, of water from a water-alcohol mixture by countercurrent contact of a vaporous stream of the water-alcohol mixture with a liquid extractant to remove water from the water-alcohol mixture, the extractant retaining water removed from the water-alcohol mixture, while recovering a vaporous stream of alcohol from which water has been removed, and water is removed from the water-containing extractant in an extractant concentrator associated with said anhydrous extraction column, the improvement comprising, boiling the water-containing extractant in a first heat exchanger associated with said anhydrous extraction column, which is heated with water vapor from the water removed from the extractant, to provide reboil for said extraction column, transporting the extractant from the anhydrous extraction column to a second heat exchanger associated with an extractant concentrator, heating and removing a major portion of the water from said extracting within said second heat exchanger which is heated by hot dried extractant produced in said extractant concentrator, this leaving residual water in said extractant, and then removing the residual water from the extractant while countercurrently contacting said heated extractant within said extractant concentrator with at least a portion of said vaporous stream of alcohol from which water has been removed, and then transporting said alcohol vapor containing the water removed from the extractant to said first heat exchanger and therein condensing a portion of this vapor stream to supply heat to the extraction column.

6. The process of claim 5 wherein a reflux stream of alcohol and water is introduced into the top of the extractant concentrator and passed downwardly into contact with a rising stream containing alcohol and water vapor, scrubbing said stream to permit essentially only alcohol and water vapor to leave the top of the extractant concentrator, condensing said scrubbed stream consisting essentially of alcohol and water in said first heat exchanger and returning the condensed water to a beer still to remove it from the drying system, and then injecting the uncondensed vapor portion of said scrubbed stream consisting essentially of alcohol and water vapor into the anhydrous column.

7. The process of claim 5 wherein the alcohol used in the extractant concentrator to remove residual water from said extractant is reintroduced into the anhydrous column to be dried.

8. The process of claim 5 wherein the alcohol is a low molecular weight monohydric alcohol containing from one to about 6 carbon atoms.

9. The process of claim 8 wherein the alcohol is ethanol, n-propanol or isopropanol.

10. The process of claim 5 wherein the extractant is a glycol diether.

11. The process of claim 5 further comprising compressing an additional portion of the vaporous stream of alcohol from which water has been removed, prior to contact thereof with said extractant, to a pressure as great as that upon the hot dry extractant transported to said second heat exchanger thereby absorbing the alcohol vapor into the extractant and raising the temperature thereof due to the heat of condensation of the alcohol, this providing additional heat sufficient to vaporize additional water from the water-containing extractant when it is passed through the second heat exchanger.

* * * * *